C. H. LISTER.
BEARING FOR CONVEYER ROLLERS.
APPLICATION FILED FEB. 21, 1919.
1,351,481.
Patented Aug. 31, 1920.
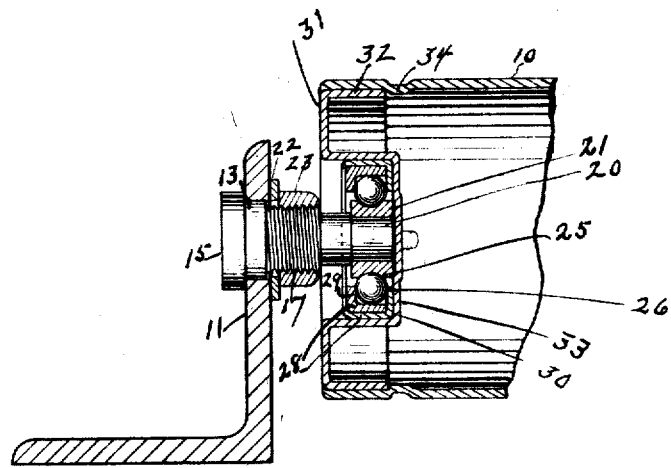
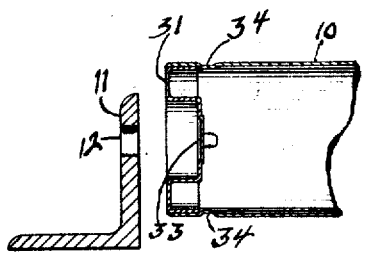
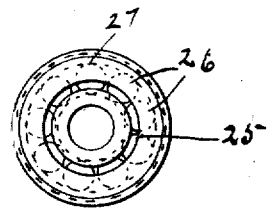
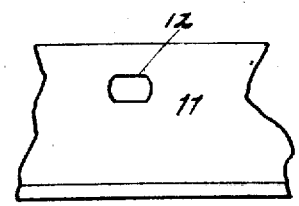
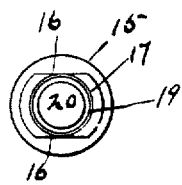
Inventor:
Charles Henry Lister
John E. Stryker
Attorney.

UNITED STATES PATENT OFFICE.

CHARLES HENRY LISTER, OF NORTH ST. PAUL, MINNESOTA.

BEARING FOR CONVEYER-ROLLERS.

1,351,481.  Specification of Letters Patent.  Patented Aug. 31, 1920.

Application filed February 21, 1919. Serial No. 278,323.

*To all whom it may concern:*

Be it known that I, CHARLES HENRY LISTER, a citizen of the United States, residing at North St. Paul, in the county of Ramsey and State of Minnesota, have invented new and useful Improvements in Bearings for Conveyer-Rollers, of which the following is a specification.

My invention relates to bearings for conveyer rollers.

The object of my invention is to provide a bearing of increased efficiency and durability.

A further object is to provide a bearing of this class, which may be easily assembled and replaced, if worn or broken, without removing the frame from the rollers.

In the drawings Figure 1 is a central vertical section of one of my bearings; Fig. 2 is a diagrammatic view of a fragment of the angle iron and end of the roller; Fig. 3 is a detail showing the arrangement of the anti-friction balls in the race and cage; Fig. 4 is a fragmentary view of the angle iron illustrating the shape of the perforation 12, and Fig. 5 is an end view of the stud.

In the drawings, the numeral 10 indicates a tubular roller and 11 an angle iron forming one of the parallel supports for a series of such rollers. Only one of the supports is shown but it is to be understood that the construction of the roller and the bearings therefor are duplicated at the other end of the roller.

Through an oblong perforation 12 in the angle iron 11, I insert a stud 13 with a head 15 on the outside of said angle iron. At the base of the head 15, a portion of the stud is cut away on parallel lines 16 so that it may be freely inserted in the oblong perforation 12 and locked against revolution (see Figs. 4 and 5). Inside the angle iron the stud 13 is formed with a threaded portion 17, a plain section terminating in a shoulder 19 and a reduced inner end or pintle 20. The threaded portion is adapted to receive the split washer 22 and nut 23 and the pintle 20 to support the hereinafter described ball race 21. This stud bolt is held against longitudinal movement in the angle iron by means of the split washer 22 and nut 23 which clamp the stud bolt in fixed position in the angle iron. The annular race 21 is journaled upon the reduced end 20 of the stud with its outer surface in contact with the shoulder 19 formed on the stud. A central peripheral groove 25 in the race 21 furnishes the inner bearing surface for the anti-friction balls 26. The cage or ball retainer 27 is formed in two parts each of which is provided with peripheral flanges 28, telescoping one within the other, to retain the balls, the section 29 of said cage being adapted to fit snugly within the section 30; and to facilitate the assembling of the cage I make the outer section 30 of soft metal while the inner section 29 as well as the race-way 21 are preferably composed of case hardened and pack hardened metal respectively. The outer end of the tube 10 is filled by a sheet metal plug 31, shaped with an annular flange 32, adapted to fit snugly within the periphery of the roller and having a central cup-shaped portion 33 which is adapted to freely receive the bearing cage 27 and hold said cage with the race 21 upon the stud. This plug 31 is fixed rigidly in the end of the tube 10 by crimping the edge of the tubing about the outer diameter of the face of the plug and securing the latter against inward movement by a series of punched projections 34 formed in the tubing at the inner edge of the flange 32. It will thus be seen that the cup 33 in the roller, co-acting with the shoulder 19 on the stud, forms a housing for the race-way 21 and cage 27.

It will also be noted that the plain portion of the stud 13 beween the threads 17 and shoulder 19 is sufficiently long to permit the loosening of the nut 23 so that the cage 27 with the race 21 may be removed for adjustment or repair without affecting other bearings or removing the rollers from their supports.

Having described my invention, what I claim as new and desire to protect by Letters Patent is:

1. In a bearing for conveyer rollers, a stud having a medial thread and a smooth inner end, forming a shoulder and a projecting bearing pintle, an annular race-way adapted to revolve freely upon said pintle and to fit against said shoulder, a peripheral groove in said race way, a two part annular ball cage adapted to retain a series of balls in said groove, a series of anti-friction balls in said cage, and a tubular roller, provided with an end plug formed with axial cups adapted to fit freely over said cage and co-operate with said shoulder to hold said cage against lateral movement on the stud, 2. In a bearing for conveyer rollers, a stud formed with an outer head, a medial thread and a smooth inner end having an annular shoulder and a projecting bearing pintle, a cylindrical race-way, journaled upon said pintle and fitting against said shoulder, an annular ball cage adapted to retain a series of balls on said pintle, a series of anti-friction balls arranged on said pintle within said cage, and a roller provided with an end plug formed with axial cups adapted to fit freely over said cage and to co-act with said shoulder on said stud to hold said cage against lateral movement.

3. In a bearing for conveyer rollers, a stud formed with a medial thread and a smooth inner end having an annular shoulder and a projecting bearing pintle of reduced diameter, an annular race-way adapted to revolve freely upon said pintle and to fit against said shoulder, a groove in the periphery of said race-way, a two-part annular ball cage adapted to retain a series of balls in said groove, a series of anti-friction balls in said groove, a tubular roller having an end plug formed with an axial cup adapted to fit freely over said cage and to co-act with said shoulder on said stud to hold said cage against lateral movement, said plug being held in place by a series of depressions in the roller at the inner end of the plug and by crimping the outer end of the tube about the outer diameter of the face of the plug.

4. In a bearing for conveyer rollers a stud, formed with a shoulder, a ball race journaled on the stud, abutting the shoulder, a cage concentric with said race, a roller having an axial cup in its end, said cup and shoulder forming a housing for said race and cage, and a lock nut threaded on the stud and spaced from the shoulder a sufficient distance to permit it to be released without removing the cage from the cup.

Whereof, I have hereunto subscribed my name to this specification.

CHARLES HENRY LISTER.